(12) United States Patent
Wang et al.

(10) Patent No.: US 11,934,887 B1
(45) Date of Patent: Mar. 19, 2024

(54) DISTRIBUTED MODEL COMPILATION

(71) Applicant: ZHEJIANG LAB, Hangzhou (CN)

(72) Inventors: Hongsheng Wang, Hangzhou (CN); Fei Wu, Hangzhou (CN); Guang Chen, Hangzhou (CN); Feng Lin, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/466,384

(22) Filed: Sep. 13, 2023

(30) Foreign Application Priority Data

Jun. 19, 2023 (CN) .......................... 202310727219.0

(51) Int. Cl.
  *G06F 9/50* (2006.01)
  *G06F 8/41* (2018.01)

(52) U.S. Cl.
  CPC .............. *G06F 9/5072* (2013.01); *G06F 8/41* (2013.01); *G06F 9/5066* (2013.01); *G06F 2209/5016* (2013.01); *G06F 2209/5017* (2013.01)

(58) Field of Classification Search
  None
  See application file for complete search history.

(56) References Cited

U.S. PATENT DOCUMENTS

| | | | |
|---|---|---|---|
| 2004/0154002 | A1 | 8/2004 | Ball et al. |
| 2009/0021955 | A1* | 1/2009 | Kuang ................... H05B 45/48 362/478 |
| 2010/0037035 | A1* | 2/2010 | Archer ................... G06F 8/443 712/E9.016 |
| 2020/0265301 | A1* | 8/2020 | Burger ................... G06N 3/084 |

FOREIGN PATENT DOCUMENTS

| | | |
|---|---|---|
| CN | 103514025 A | 1/2014 |
| CN | 110908667 A | 3/2020 |
| CN | 112463123 A | 3/2021 |

(Continued)

OTHER PUBLICATIONS

State Intellectual Property Office of the People's Republic of China, Office Action and Search Report Issued in Application No. 2023107272190, dated Aug. 15, 2023, 23 pages.(Submitted with Machine/Partial Translation).

(Continued)

*Primary Examiner* — Eric C Wai
(74) *Attorney, Agent, or Firm* — The Small Patent Law Group LLC; Christopher R. Carroll

(57) ABSTRACT

The present disclosure discloses a distributed model compilation system. A master node of the system determines the logic calculation graph of the model based on model information, divides the logic calculation graph into multiple logic calculation sub-graphs, generates a distributing message for each logic calculation sub-graph, and then transmits the distributing message to a slave node. Each of the slave nodes allocates a local computing resource to compile the logic calculation sub-graph based on the received distributing message, and transmits compilation completion information to the master node. The master node determines the completion of model compilation based on the compilation completion information returned by each slave node, and executes the target work based on the compiled model.

12 Claims, 5 Drawing Sheets

(56) References Cited

FOREIGN PATENT DOCUMENTS

| | | | |
|---|---|---|---|
| CN | 113031954 | A | 6/2021 |
| CN | 113703741 | A | 11/2021 |
| CN | 114691233 | A | 7/2022 |
| CN | 114841322 | A | 8/2022 |
| CN | 115511086 | A | 12/2022 |
| CN | 115543639 | A | 12/2022 |
| CN | 116126346 | A | 5/2023 |
| CN | 116185532 | A | 5/2023 |
| JP | 2004094581 | A | 3/2004 |

OTHER PUBLICATIONS

Yang Sheng zhe atc. "Dynamic task scheduling and optimization of data flow program" "Computer Engineering&ScienceV01.39, No. 7, Jul. 2017" Jul. 15, 2017, 10 pages.

* cited by examiner

DISTRIBUTED MODEL COMPILATION

CROSS REFERENCE TO RELATED APPLICATIONS

This application claims priority to Chinese Patent Application No. 2023107272190 filed on Jun. 19, 2023, the entire content of which is incorporated herein by reference.

TECHNICAL FIELD

The present disclosure relates to the technical field of machine learning, in particular to distributed model compilation.

BACKGROUND

With the development of machine learning, deep learning has become a new research direction in this field. Regardless of a training process of a model or a process of applying a model to execute business, the model needs to be compiled first to determine files that can run on a hardware device. This process is generally accompanied by significant resource consumption, especially for deep neural networks, which are typically complex in structure and have a large number of parameters, resulting in a greater demand for computing and storage resources. Therefore, in order to improve performance and efficiency of deep learning, it is necessary to design an efficient model compilation system.

In relevant technologies, a model is compiled into files that are runnable on a computing device, and then the compiled files are run on the computing device.

However, in relevant technologies, when using distributed mechanisms for model compilation, uneven loads of a master node and a slave node lead to low resource utilization and excessive load on the master node in a distributed system. Thus, in the present disclosure, a distributed model compilation system is provided.

SUMMARY

The present disclosure provides a distributed model compilation system, method and apparatus, a storage medium and a device to partially solve the problems existing in the prior art.

The present disclosure adopts following technical solutions.

For the first aspect, the present disclosure provides a distributed model compilation system, including a master node and a plurality of slave nodes, where the master node is configured to: according to model information of a to-be-compiled model, determine a logic calculation graph of the to-be-compiled model; divide the logic calculation graph into a plurality of logic calculation sub-graphs; for each of the plurality of the logic calculation sub-graphs, generate a distributing message, and transmit the distributing message to one of the plurality of the slave nodes; in response to receiving compilation completion information returned from the plurality of the slave nodes, determine completion of a compilation of the to-be-compiled model; and according to a compiled model, execute a target work; and each of the plurality of the slave nodes is configured to: receive the distributing message transmitted by the master node; according to the distributing message, allocate a local computing resource of the slave node, to compile the logic calculation sub-graph contained in the distributing message based on the local computing resource to determine a task calculation sub-graph; according to the task calculation sub-graph, transmit compilation completion information to the master node.

In some embodiments, the master node is further configured to: according to a received compilation request, create an event executor that executes an event for the compilation request, and determine the model information of the to-be-compiled model, and for each of the plurality of the slave nodes, generate the distributing message, and transmit the distributing message to the slave node; and by the event executor, receive the compilation completion information returned from the plurality of the slave nodes, determine the compiled model, and execute the target work.

In some embodiments, the master node is further configured to: by the event executor, determine statuses of the plurality of the slave nodes; and according to the statuses of the plurality of the slave nodes, divide the logic calculation graph into the plurality of the logic calculation sub-graphs.

In some embodiments, the master node is further configured to: after determining the statuses of the plurality of the slave nodes, create a session control executor by the event executor; by the session control executor, according to the statuses of the plurality of the slave nodes, divide the logic calculation graph into the plurality of the logic calculation sub-graphs; and determine a logic calculation sub-graph for each of the plurality of the slave nodes.

In some embodiments, the master node is further configured to: by the session control executor, for each of the plurality of the logic calculation sub-graphs, create a sub graph executor for the logic calculation sub-graph; determine corresponding relationships between sub graph executors, the logic calculation sub-graphs, and the slave nodes; and for each of the sub graph executors, create a device executor deployed on a slave node corresponding to the sub graph executor, generate a distributing message according to the device executor and the logic calculation sub-graph for the sub graph executor, and transmit the distributing message to the slave node corresponding to the sub graph executor.

In some embodiments, each of the plurality of the slave nodes is further configured to: according to the distributing message, determine the logic calculation sub-graph to be processed by the slave node and the device executor corresponding to the slave node; and by the device executor, according to a real-time status of the slave node, an input tensor of the logic calculation sub-graph and an output tensor of the logic calculation sub-graph, allocate the local computing resource of the slave node.

In some embodiments, each of the plurality of the slave nodes is further configured to: by the device executor corresponding to the slave node, determine one or more tasks for compiling the logic calculation sub-graph; according to the one or more tasks, determine at least one calculation flow; and create a calculation flow executor for each of the at least one calculation flow, execute the one or more tasks by at least one calculation flow executor, complete a compilation for the logic calculation sub-graph, and determine the task calculation sub-graph.

In some embodiments, each of the plurality of the slave nodes is further configured to: by the device executor corresponding to the slave node, determine the task calculation sub-graph compiled by the at least one calculation flow executor, and return the task calculation sub-graph to the sub graph executor corresponding to the slave node in the master node; and the master node is further configured to: by the sub graph executors, receive task calculation sub-graphs returned from the plurality of the slave nodes, and according to the task calculation sub-graphs returned by the plurality of the slave nodes, determine the compiled model.

In some embodiments, the master node is further configured to: before dividing the logic calculation graph into the plurality of the logic calculation sub-graphs, transmit a query request to each slave node in the distributed model compilation system; and according to a status returned by each slave node in the distributed model compilation system, determine the plurality of the slave nodes for compiling the plurality of the logic calculation sub-graphs; and each slave node in the distributed model compilation system is configured to: receive the query request transmitted by the master node, according to the query request, determine a real-time status of the slave node, and return the real-time status to the master node.

For the second aspect, the present disclosure provides a distributed model compilation method, applied to a master node in a distributed model compilation system, including:
  according to model information of a to-be-compiled model, determining a logic calculation graph of the to-be-compiled model;
  dividing the logic calculation graph into a plurality of logic calculation sub-graphs; for each of the plurality of the logic calculation sub-graphs, generating a distributing message, and
  transmitting the distributing message to one of a plurality of slave nodes of the distributed model compilation system, such that the slave node, according to the distributing message, allocates a local computing resource of the slave node to compile the logic calculation sub-graph contained in the distributing message based on the local computing resource to determine a task calculation sub-graph, and transmits compilation completion information to the master node according to the task calculation sub-graph;
  receiving compilation completion information returned from the plurality of the slave nodes, and determining completion of a compilation of the to-be-compiled model; and according to a compiled model, executing a target work.

In some embodiments, according to the model information of the to-be-compiled model, determining the logic calculation graph of the to-be-compiled model includes:
  receiving a compilation request;
  according to the compilation request, creating an event executor that executes an event for the compilation request;
  by the event executor, determining the model information of the to-be-compiled model according to the compilation request, and according to the model information of the to-be-compiled model, determining the logic calculation graph of the to-be-compiled model;
  dividing the logic calculation graph into the plurality of the logic calculation sub-graphs, and for each of the plurality of the logic calculation sub-graphs, generating the distributing message includes:
  by the event executor, dividing the logic calculation graph into the plurality of the logic calculation sub-graphs, and for each of the plurality of the logic calculation sub-graphs, generating the distributing message;
  transmitting the distributing message to one of the plurality of the slave nodes includes:
  by the event executor, transmitting the distributing message to one of the plurality of the slave nodes; and receiving the compilation completion information returned from the plurality of the slave nodes, determining the completion of the compilation of the to-be-compiled model, and executing the target work according to the compiled model includes:
  by the event executor, receiving the compilation completion information returned from the plurality of the slave nodes, determining the compiled model, and executing the target work.

In some embodiments, by the event executor, dividing the logic calculation graph into the plurality of the logic calculation sub-graphs includes:
  by the event executor, determining statuses of the plurality of the slave nodes; and
  according to the statuses of the plurality of the slave nodes, dividing the logic calculation graph into the plurality of the logic calculation sub-graphs.

In some embodiments, according to the statuses of the plurality of the slave nodes, dividing the logic calculation graph into the plurality of the logic calculation sub-graphs includes:
  by the event executor, creating a session control executor;
  by the session control executor, according to the statuses of the plurality of the slave nodes, dividing the logic calculation graph into the plurality of the logic calculation sub-graphs, and determining a logic calculation sub-graph for each of the plurality of the slave nodes.

In some embodiments, for each of the plurality of the logic calculation sub-graphs, generating the distributing message includes:
  by the session control executor, for each of the plurality of the logic calculation sub-graphs, creating a sub graph executor for the logic calculation sub-graph; determining corresponding relationships between sub graph executors, the logic calculation sub-graphs, and the slave nodes; and
  for each of the sub graph executors, creating a device executor deployed on a slave node corresponding to the sub graph executor, generating a distributing message according to the device executor and the logic calculation sub-graph for the sub graph executor, and transmitting the distributing message to the slave node corresponding to the sub graph executor.

In some embodiments, receiving the compilation completion information returned from the plurality of the slave nodes and determining the compiled model includes:
  by the sub graph executors, receiving task calculation sub-graphs returned from the plurality of the slave nodes, and
  by the session control executor, according to the task calculation sub-graphs returned by the plurality of the slave nodes, determining the compiled model.

In some embodiments, before dividing the logic calculation graph into the plurality of the logic calculation sub-graphs, the method further includes:
  transmitting a query request to each slave node in the distributed model compilation system, such that each slave node in the distributed model compilation system determines a real-time status of the slave node according to the query request, and returns the real-time status to the master node; and
  according to the status returned by each slave node in the distributed model compilation system, determining the plurality of the slave nodes for compiling the plurality of the logic calculation sub-graphs.

For the third aspect, the present disclosure provides a distributed model compilation method, applied to each of a plurality of slave nodes in a distributed model compilation system, including:
- receiving a distributing message transmitted by a master node in the distributed model compilation system, where the distributing message is generated by the master node according to a logic calculation sub-graph, and the logic calculation sub-graph obtained by dividing a logic calculation graph corresponding to model information of a to-be-compiled model by the master node;
- according to the distributing message, allocating a local computing resource of the slave node;
- based on the local computing resource, compiling the logic calculation sub-graph contained in the distributing message, to determine a task calculation sub-graph; and
- according to the task calculation sub-graph, transmitting compilation completion information to the master node, such that the master node, in response to receiving compilation completion information returned from the plurality of the slave nodes, determines completion of a compilation of the to-be-compiled model, and executes a target work according to a compiled model.

In some embodiments, according to the distributing message, allocating the local computing resource of the slave node includes:
- according to the distributing message, determining the logic calculation sub-graph to be processed and a device executor; and
- by the device executor, according to a real-time status of the slave node, an input tensor of the logic calculation sub-graph and an output tensor of the logic calculation sub-graph, allocating the local computing resource of the slave node.

In some embodiments, based on the local computing resource, compiling the logic calculation sub-graph contained in the distributing message, to determine the task calculation sub-graph includes:
- by the device executor, determining one or more tasks for compiling the logic calculation sub-graph;
- according to the one or more tasks, determining at least one calculation flow; creating a calculation flow executor for each of the at least one calculation flow; and
- executing the one or more tasks by at least one calculation flow executor, completing a compilation for the logic calculation sub-graph, and determining the task calculation sub-graph.

In some embodiments, according to the task calculation sub-graph, transmitting the compilation completion information to the master node includes:
- by the device executor, determining the task calculation sub-graph compiled by the at least one calculation flow executor; and
- by the device executor, returning the task calculation sub-graph to a sub graph executor corresponding to the slave node in the master node,
- such that the master node, according to the task calculation sub-graphs returned by the plurality of the slave nodes, determines the compiled model.

For the fourth aspect, the present disclosure provides a distributed model compilation apparatus, applied to a master node in a distributed model compilation system, including:
- a determining module, configured to, according to model information of a to-be-compiled model, determine a logic calculation graph of the to-be-compiled model;
- a logic dividing module, configured to divide the logical calculation graph into a plurality of logic calculation sub-graphs, and for each of the plurality of the logic calculation sub-graphs, generate a distributing message;
- a transmitting module, configured to transmit the distributing message to one of a plurality of slave nodes in the distributed model compilation system, such that the slave node, according to the distributing message, allocates a local computing resource of the slave node to compile the logic calculation sub-graph contained in the distributing message based on the local computing resource to determine a task calculation sub-graph, and transmits compilation completion information to the master node according to the task calculation sub-graph; and
- a receiving module, configured to receive the compilation completion information returned from the plurality of the slave nodes, determine completion of a compilation of the to-be-compiled model, and execute the target work according to a compiled model.

For the fifth aspect, the present disclosure provides a distributed model compilation apparatus, applied to each of a plurality of slave nodes in a distributed model compilation system, including:
- a receiving module, configured to receive a distributing message transmitted by a master node in the distributed model compilation system, where the distributing message is generated by the master node according to a logic calculation sub-graph, and the logic calculation sub-graph obtained by dividing a logic calculation graph corresponding to model information of a to-be-compiled model by the master node;
- a resource allocating module, configured to, according to the distributing message, allocate a local computing resource of the slave node;
- a compiling module, configured to, based on the local computing resource, compile the logic calculation sub-graph contained in the distributing message, to determine a task calculation sub-graph; and
- a transmitting module, configured to, according to the task calculation sub-graph, transmit compilation completion information to the master node, such that the master node, in response to receiving compilation completion information returned from the plurality of the slave nodes, determines completion of a compilation of the to-be-compiled model, and executes a target work according to a compiled model.

For the sixth aspect, the present disclosure provides a computer-readable storage medium, where the storage medium stores a computer program, and the computer program when executed by a processor achieves the contributed model compilation method according to the second or third aspect mentioned above.

For the seventh aspect, the present disclosure provides an unmanned device, including a memory, a processor and a computer program stored on the memory and runnable on the processor, where the processor when executing the program, achieves the contributed model compilation method according to the second or third aspect mentioned above.

At least one of the above technical solutions adopted in the present application can achieve the following beneficial effects.

In the distributed model compilation system provided in the present disclosure, the master node determines the model information to be compiled according to the received compilation request, and then determines a logic calculation graph that represents a calculation logic of the to-be-compiled model according to the model information. At the same time, the master node transmits a query request to each slave node, and determines the status of each slave node based on the information returned by each slave node. According to the logic calculation graph and the status of each slave node, the master node divides the logic calculation graph into multiple logic calculation sub-graphs. The master node then generates a distributing message based on a logic calculation sub-graph and transmits the distributing message to a corresponding slave node. Based on the received distributing message, the slave node determines the logic calculation sub-graph to be compiled, and compiles the logic calculation sub-graph to obtain the task calculation sub-graph that can be run on the computing device. After completing the compilation of the logic calculation sub-graph, the slave node transmits the compilation completion information to the master node, where the compilation completion information can include the compiled task calculation sub-graph. The master node determines whether the model has been compiled based on the received compilation completion information.

From the above methods, it can be seen that during model compilation, the distributed model compilation system logically divides a calculation graph for the model to determine multiple sub graphs. Afterwards, a compilation process of each sub graph is no longer executed by the master node, but is allocated to each slave node, which improves the utilization of computing resources of the slave nodes and reduces the load on the master node. Moreover, since sub graphs are compiled in parallel by multiple slave nodes, the model compilation efficiency can be greatly improved. Moreover, the master node no longer performs a compilation for a global calculation graph, which can further reduce waiting time of the slave nodes, making full utilization of the computing resources and the storage resources of the master node and the slave nodes.

BRIEF DESCRIPTION OF DRAWINGS

The accompanying drawings illustrated herein are used to provide further understanding of the present disclosure and form a part of the present disclosure. The exemplary embodiments and descriptions of the present disclosure are used to explain the present disclosure, and do not constitute an improper limitation of the present disclosure.

DETAILED DESCRIPTION

In order present the purposes, technical solutions and advantages of the present disclosure clearer, the technical solutions of the present disclosure will be clearly and completely described below in conjunction with specific embodiments and corresponding drawings of the present disclosure. The described embodiments are only a part of the embodiments of the present disclosure, and not all of them. Other embodiments achieved by those of ordinary skill in the art based on the embodiments in the present disclosure without paying creative work shall all fall within the scope of protection of the present disclosure.

The technical solutions provided in the embodiments of the present disclosure are described in detail below in conjunction with the accompanying drawings.

Figure 1:
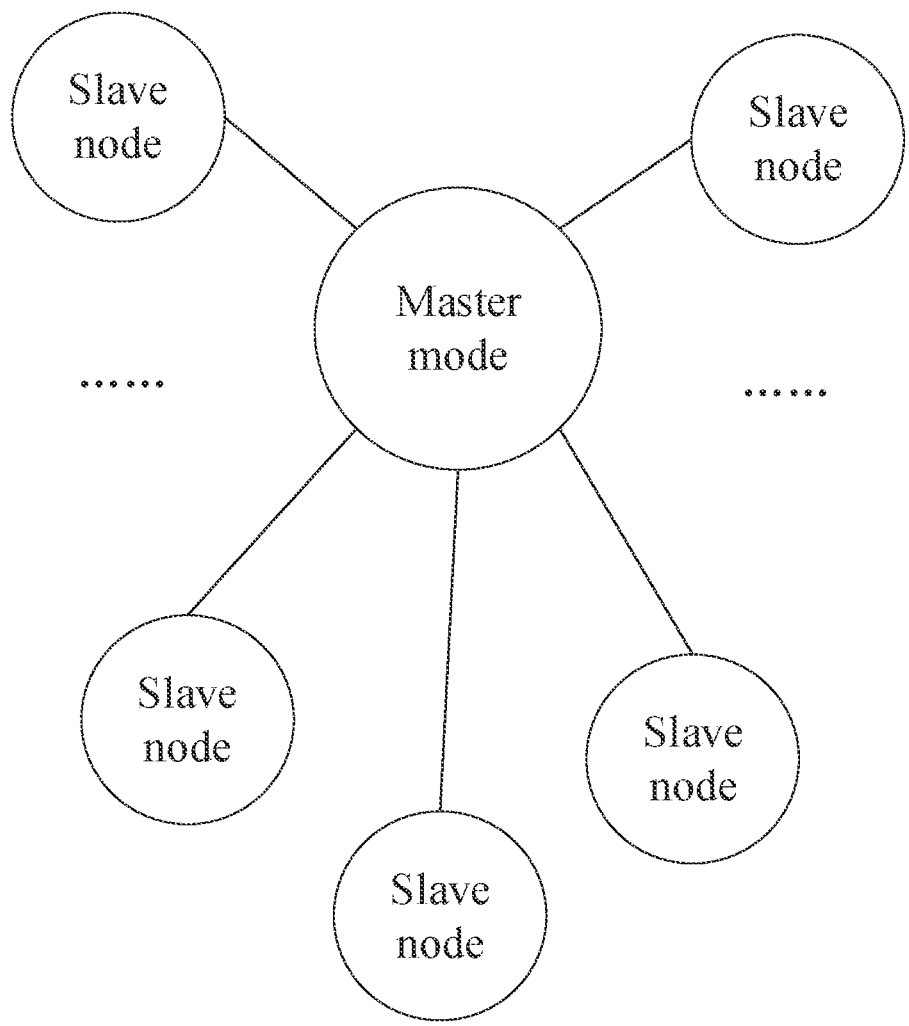
FIG. 1 is a structural schematic diagram of a distributed model compilation system according to embodiments of the present disclosure.

FIG. 1 is a structural schematic diagram of a distributed model compilation system according to embodiments of the present disclosure. The distributed model compilation system is configured to perform a model compilation. The distributed system can be composed of multiple nodes that communicate with each other, which can be divided into a master node and a slave node according to a function of a node during the model compilation. There are usually one master node and multiple slave nodes, which is not limited in the present disclosure. For a compilation process of a model, a master node is responsible for an event corresponding to the compilation process. However, in a distributed system, multiple models can be compiled simultaneously, and different nodes can serve as the master nodes to respectively perform the compilation processes for different models. For the convenience of explanation, the following description takes a process of compiling a model by the distributed system as an example to describe the distributed model compilation system. In this case, there is one master node in the distributed system, and the other nodes in the distributed system are slave nodes.

In addition, it should be noted that in one or more embodiments of the present disclosure, a computing device of a node in the distributed system are not limited in the present disclosure. The node (including a master node or a slave node) can be a personal terminal, a tablet, a server, a heterogeneous computing device, and so on. Moreover, nodes in the distributed system can communicate with each other.

In one or more embodiments of the present disclosure, in order to improve model compilation efficiency to make the system load more balanced, and reduce resource waste, The master node is configured to determine a logic calculation graph of the to-be-compiled model, and divide the logic calculation graph into multiple logic calculation sub-graphs and transmit the logic calculation sub-graphs to slave nodes. Each slave node is configured to receive a logic calculation sub-graph and compile the logic calculation sub-graph to determine a task calculation sub-graph. The task calculation sub-graph is a file that can be run on the computing device, which means that after determining the task calculation sub-graphs of the to-be-compiled model, the compilation of the model is completed. Subsequently, by the distributed system, the model can be trained, or applied to perform tasks, or a calculation graph structure of the model can be optimized. In some embodiments, the task calculation sub-graphs can also be summarized to determine an executable file for the model, and the executable file for the model can be run by a computing device for training, application, optimization, etc., which is not limited in the present disclosure.

It can be seen that through the master node of the distributed system, the calculation graph for the model can be logically divided to determine multiple calculation sub-graphs. Afterwards, a compilation process of each sub graph is no longer executed by the master node, but is allocated to each slave node, which improves the utilization of computing resources of the slave nodes and reduces the load on the master node. Moreover, since calculation sub-graphs are compiled in parallel by multiple slave nodes, the model compilation efficiency can be greatly improved. Moreover, the master node no longer performs a compilation for a global calculation graph, which can further reduce waiting time of the slave nodes, making full utilization of the computing resources and the storage resources of the master node and the slave nodes.

For example, in one or more embodiments of the present disclosure, firstly, since in the distributed system, the master node is the control center configured to implement model compilation, when model compilation is required, model information of the to-be-compiled model is carried in a compilation request and the compilation request is transmitted to the master node. Then the master node can receive the compilation request and determine the model information of the to-be-compiled model based on the compilation request. The model information can include one or more of structure information, parameter information, operator information, weight information, or other information of the model, that is, the model information can include information that describes how the to-be-compiled model is calculated. Based on the model information, the model can be compiled to determine the corresponding executable file.

Afterwards, the master node can determine a logic calculation graph of the to-be-compiled model based on the model information of the to-be-compiled model. When the to-be-compiled model is a neural network model, the logic calculation graph represents a data calculation process in the neural network model. Typically, the logic calculation graph is a Directed Acyclic Graph (DAG), which includes calculation steps of the to-be-compiled model at runtime. It should be noted that the logic calculation graph is not a file that can be run by the computing device, and is only configured to represent an internal calculation logic of the model. The master node generates the logic calculation graph, such that the master node can based on the calculation logic within the model, divide the calculation process of the model into multiple parts. The parts can be either decoupled or related, which is not limited in the present disclosure. For example, if the parts are decoupled, distributed deployment of the model can be more easily performed subsequently. The master node can then allocate the divided parts to different slave nodes, and each of the slave nodes compiles part of the calculation steps of the model. On the one hand, since the master node only generate the logic calculation graph, the load on the master node is reduced. On the other hand, since each of the slave nodes only needs to compile a part of the model, the load on each slave node is also smaller compared to compiling the entire model. By effectively utilizing distributed mechanisms, the model compilation process is more efficient and the performance requirement for the computing device is lower.

Secondly, after the master node determines the logic calculation graph, the master node can divide the logic calculation graph into multiple logic calculation sub-graphs. In some embodiments, when dividing the logic calculation graph, the master node can evenly divide the logic calculation graph into multiple logic calculation sub-graphs. For example, the master node can first determine the number of nodes in the current distributed system to determine the number of slave nodes that can perform compilation tasks. Then, based on the number of slave nodes, the logic calculation graph can be evenly divided into logic calculation sub-graphs. Evenly dividing can be based on the number of nodes in the logic calculation graph. For example, if the logic calculation sub-graph contains 100 calculation nodes and the distributed system contains 10 slave nodes, then every 10 calculation nodes in the logic calculation sub-graph are grouped to obtain 10 logic calculation sub-graphs. The number of logic calculation sub-graphs does not need to correspond to the number of slave nodes one by one. For example, if there are 10 slave nodes, the master node can divide the logic calculation graph into 10 logic calculation sub-graphs, as well as 9, 5, or 3 logic calculation sub-graphs. The number of logic calculation sub-graphs divided does not exceed the number of slave nodes, such that a slave node is responsible for compiling at most one logic calculation sub-graph.

In addition, the master node can also divide the logic calculation graph based on the status of each slave node. Then the master node can first transmit a status query request to each slave node, such that each slave node determines a current status of the slave node and return the current status to the master node. The status can include at least one of an attribute of a slave node or a real-time computing resource of a slave node. The attribute of a slave node can include: a bandwidth, a memory, a computing speed, or other attribute information of a slave node. The real-time computing resource of a node can include: a storage resource utilization, a computing resource utilization, and so on. That is, the master node can, based on the statuses of the slave nodes, determine which slave node can compile more content, to determine how to divide the logic calculation graph, which allows for the allocation of a more complex compilation task to a slave node with stronger performance and lower load.

Furthermore, when dividing the logic calculation graph, the master node can determine the calculation flows of the logic calculation graph based on dependency relationships between operators included in the logic calculation graph. A calculation flow consists of multiple computational tasks that are executed sequentially. Therefore, the master node can also divide the logic calculation graph based on various calculation flows of the logic calculation graph. For example, operators on one calculation flow are divided into a logic calculation sub-graph.

The present disclosure does not limit how the master node divides the logic calculation graph, which can be set according to needs. It is necessary that the divided logic calculation sub-graphs can be compiled on the slave nodes, and a slave node only needs to compile one logic calculation sub-graph.

Afterwards, the master node can generate distributing messages based on corresponding relationships between the logic calculation sub-graphs and the slave nodes, and transmit the distributing messages to slave nodes such that the slave node can compile the assigned logic calculation sub-graph. Therefore, the master node needs to first determine the corresponding relationships between the logic calculation sub-graphs and the slave nodes to determine which slave node to transmit a distributing message to. In one or more embodiments of the present disclosure, when a dividing manner of the logic calculation graph is different, the corresponding relationships between the logic calculation sub-graphs and the slave nodes are also different. Since the dividing manner of the logic calculation graph by the master node in the present disclosure can be set as needed, it is necessary to determine the corresponding relationships based on the adopted dividing manner.

In one or more embodiments of the present disclosure, when the master node divides the logic calculation graph based on the number of calculation nodes in the logic calculation graph, for any logic calculation sub-graph, any slave node can compile the logic calculation sub-graph. Therefore, the master node can randomly determine a slave node for each logic calculation sub-graph.

In one or more embodiments of the present disclosure, when the master node divides a logical computing graph based on the statuses of the slave nodes, a divided logical sub computing graph corresponds to a status of a node. Therefore, for each of the slave nodes, a logical sub computing graph corresponding to the slave node can be determined based on the status of the slave node. The master node can determine complexity of compiling a logic calculation sub-graph. For example, the more operators there are, the more dependencies between operators, and the more complex the compilation. Then, the logic calculation sub-graphs are sorted from high to low according to the complexity, and the slave nodes are sorted from high to low according to the computation performance of the slave nodes. Then, the high-complexity logic calculation sub-graph corresponds to the high-computation-performance slave node according to two sorts. In some embodiments, since the logic calculation sub-graphs are divided based on the statuses of the slave nodes, and the status of the slave node not only includes computation performance, the master node can also sort the slave nodes based on other attributes. The present disclosure does not limit the information used to sort slave nodes. The above sorting manner is only an example, and the master node can also determine the corresponding relationships in other ways, as long as compilation complexity of a logic calculation sub-graph corresponds to a compilation ability of a slave node.

When the master node divides the logic calculation graph based on calculation flows in the logic calculation graph, since there is no corresponding relationship between the calculation flows and the slave nodes, for any logic calculation sub-graph, any slave node can compile the logic calculation sub-graph. Therefore, the master node can randomly determine a slave node for each logic calculation sub-graph.

After logic calculation sub-graphs are divided and the corresponding relationships between the logic calculation sub-graphs and the slave nodes are determined, the master node can generate distributing messages transmitted to the slave nodes based on the logic calculation sub-graphs. For example, for each logic calculation sub-graph, the master node can first determine a globally unique identifier corresponding to the logic calculation sub-graph when generating the distributing message for the logic calculation sub-graph; then, package the identifier with the logic calculation sub-graph to generate a distributing message; finally, based on the corresponding relationships between the logic calculation sub-graphs and the slave nodes, the distributing message for the logic calculation sub-graph is transmitted to the slave node.

For each of the slave nodes in the distributed system, when the slave node receives a distributing message transmitted by the master node, the slave node can determine a logic calculation sub-graph contained in the distributing message; based on the logic calculation sub-graph in the distributing message, the slave node derives a resource required for compiling the logic calculation sub-graph from an input tensor and an output tensor of the logic calculation sub-graph; and based on the determined resource required for compilation, and the bandwidth utilization rate and computation resource utilization rate of the slave node, the slave node determines a local resource of the slave node allocated for the logic calculation sub-graph.

For example, since a logic calculation sub-graph can contain multiple operators, the slave node can compare the input and output tensors of each operator during the calculation process, and allocate more computing resources to an operator with larger input or output tensors. At the same time, based on the number of compilation tasks corresponding to multiple operators, computing resources of the slave node can also be evenly allocated to the compilation tasks corresponding to multiple operators. The present disclosure does not limit the allocation of computing resources from slave nodes, which can be set as needed, as long as the divided computing resources can perform calculations on the corresponding operators.

Furthermore, since a logic calculation sub-graph can contain multiple interdependent computation tasks, the interdependent computational tasks can determine a calculation flow, and thus a logic calculation sub-graph can contain multiple calculation flows. Based on the allocated computing resources, the slave node compiles calculation flows separately to obtain the compilation result of the logic calculation sub-graph. Based on the compilation result, the task calculation sub-graph corresponding to the logic calculation sub-graph can be determined. It should be noted that the task calculation sub-graph is a file that can be run on a computing device, rather than just representing the computation logic of the model like the logic calculation sub-graph.

Finally, when the slave node completes the compilation of the logic calculation sub-graph and obtains the task calculation sub-graph corresponding to the logic calculation sub-graph, the slave node can, based on the global unique identifier carried on the received distributing message, generate compilation completion information carrying the global unique identifier, and return the compilation completion information to the master node.

The master node can determine the global unique identifier based on the received compilation completion information, and based on the corresponding relationships between the logic calculation sub-graphs and the global unique identifiers, determine which logic calculation sub-graph is compiled. When the master node determines that all the logic calculation sub-graphs of the logic calculation graph have completed compilation based on the received compilation completion information, the master node can determine that the to-be-compiled model is compiled, and according to a compiled model, execute a target work.

Since when the model is compiled, and the model can be an untrained model or a model that has already been trained and needs to be deployed, the target work can be set as needed. For example, when the compiled model is an untrained model, the target work can be to train the model based on a preset training sample set, and the model can be run in a distributed manner through the task calculation sub-graphs compiled by the slave nodes, to determine the output results of the model and adjust model parameters corresponding to the task calculation sub-graph in each slave node based on labels of samples. Alternatively, when the compiled model is a trained model, the target work can be a task executed based on the trained model. For example, the trained model is an image classification model, the master node can determine an image to be recognized based on a work request and transmit the image to a slave node corresponding to a logic calculation sub-graph of an input layer in the trained model, such that slave nodes for the middle layers sequentially transfer intermediate data according to a calculation order in the logic calculation graph, and finally the slave node corresponding to the logic calculation sub-graph of the output layer in the trained model determines an image classification result, and returns the image classification result to the master node. The master node determines an execution result of the target task based on the received classification result.

Based on the distributed model compilation system shown in FIG. 1, during the compilation process of the model, the master node determines the model information to be compiled based on the received compilation request, and then determines the logic calculation graph based on the model information. At the same time, the master node transmits a query request to each slave node, and determines the status of each slave node based on the information returned by each slave node. According to the logic calculation graph and the status of each slave node, the master node divides the logic calculation graph into multiple logic calculation sub-graphs. The master node then generates a distributing message based on a logic calculation sub-graph and transmits the distributing message to a corresponding slave node. Based on the received distributing message, the slave node determines the logic calculation sub-graph to be compiled, and compiles the logic calculation sub-graph to obtain the task calculation sub-graph that can be run on the computing device. After the slave node completes the compilation of the logic calculation sub-graph, the slave node transmits the compilation completion information to the master node. The master node determines whether the model has been compiled based on the received compilation completion information.

It can be seen that during model compilation, the distributed model compilation system logically divides a calculation graph for the model to determine multiple calculation sub-graphs. Afterwards, a compilation process of each calculation sub-graph is no longer executed by the master node, but is allocated to each slave node, which improves the utilization of computing resources of the slave nodes and reduces the load on the master node. Moreover, since calculation sub-graphs are compiled in parallel by multiple slave nodes, the model compilation efficiency can be greatly improved. Moreover, the master node no longer performs a compilation for a global calculation graph, which can further reduce waiting time of the slave nodes, making full utilization of the computing resources and the storage resources of the master node and the slave nodes.

In addition, the distributed compilation system in the present disclosure can further be implemented by creating a multi-level executor system. By communication between executors, costs of the interaction between the master node and the slave nodes are reduced. The creation of the multi-level executor system transforms the original communication between the master node and the slave nodes into communication between executors at different levels, with different executors responsible for different tasks. The executor in the present disclosure is an abstract execution system model. The abstract execution system model is an abstract software entity that includes a compilation environment responsible for computing and storage tasks within a certain range, and can also achieve asynchronous receiving and transmitting messages and change a status of the executor based on the message content. The executor can be executed by a processor.

Figure 2:
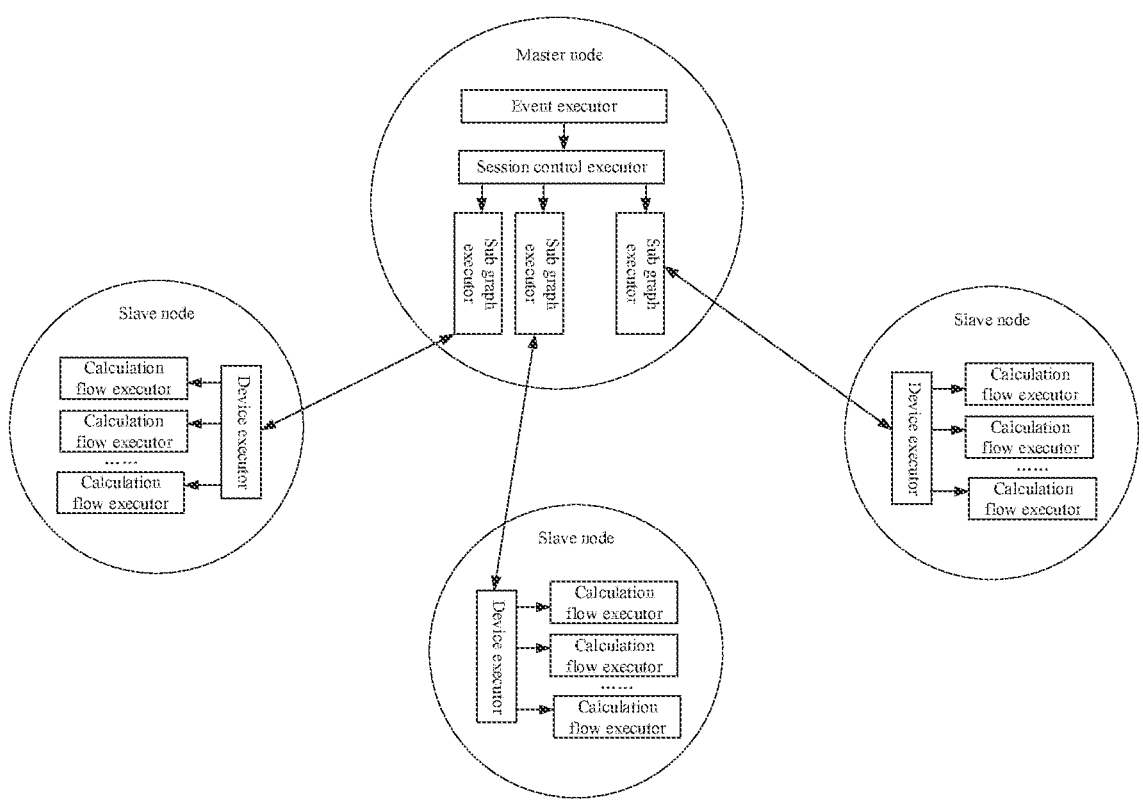
FIG. 2 is a schematic diagram of executors of a master node and slave nodes according to embodiments of the present disclosure.

The multi-level executors mentioned above can be seen in FIG. 2. FIG. 2 is a schematic diagram of executors of a master node and slave nodes according to embodiments of the present disclosure.

Between the executors of the executor system, an upper-level executor can create and destroy a lower-level executor, but cannot directly affect a compilation of the logic calculation sub-graph in the lower-level executor. Communication between executors is in a single-threaded communication manner. For each executor, the executor adjusts its own status only based on received information, and then based on an adjustment result, determines whether to transmit return information.

During the operation of the model compilation system provided in the present disclosure, the master node creates a corresponding event executor based on the received compilation request. The event executor is a top-level executor, which can obtain information about the to-be-compiled model based on the received compilation request, and determine the logic calculation graph of the to-be-compiled model based on the obtained model information. Then, the event executor transmits a query request to each slave node to determine the status of the slave node, and then divides the logic calculation graph based on the status of each slave node.

The present disclosure does not limit how the master node divides the logic calculation graph, which can be set according to needs. It is necessary that the divided logic calculation sub-graphs can be compiled on the slave nodes, and a slave node only needs to compile one logic calculation sub-graph. The event executor creates a session control executor based on the logic calculation sub-graph obtained by dividing the logic calculation graph. Finally, the event executor transmits the logic calculation sub-graph and corresponding unique identifier to the session control executor.

There can be multiple session control executors, which are responsible for distributing and running sub graphs. The session control executor creates a sub graph executor through the received logic calculation sub-graph, and determines the corresponding relationships between sub graph executors, the logic calculation sub-graphs, and the slave nodes. The corresponding relationships between the sub graph executors and the logic calculation sub-graphs can be determined based on the unique identifier in the distributing message. The corresponding relationships between the logic calculation sub-graphs and the slave nodes depends on the dividing manner of the logic calculation sub-graph. Since the dividing manner of the logic calculation graph by the master node in the present disclosure can be set as needed, it is necessary to determine the corresponding relationships based on the adopted dividing manner. After a slave node receives a distributing message containing a unique identifier from a slave node, the corresponding relationship between the slave node, the logic calculation sub-graphs and sub graph executors can be determined based on the unique identifier.

The sub graph executor is dynamically created by the session control executor based on the logic calculation sub-graph. Each sub graph executor corresponds to a logic calculation sub-graph, and the logic calculation sub-graph is responsible for creating and destroying a lower-level device executor, and transmitting compiled data to the session control executor.

For each sub graph executor, the sub graph executor first creates a device executor that can be deployed on the slave node, and then generates a distributing message based on the logic calculation sub-graph, the global unique identifier and the device executor corresponding to the sub graph executor, and transmits the distributing message to the slave node corresponding to the sub graph executor. The device executor is created by the sub graph executor during compilation, responsible for managing the computing and storage resources on a device.

The slave node according to the distributing message, determines the logic calculation sub-graph to be processed and a device executor. The device executor based on the logic calculation sub-graph, obtains an input tensor and an output tensor of the logic calculation sub-graph, and derives a resource required for compiling the logic calculation sub-graph. Based on the determined resource required for compilation, as well as the bandwidth utilization rate and the computation resource utilization rate of the slave node, the device executor determines the resource available for the compilation of the logic calculation sub-graph in the local resources of the slave node, and allocates the resource. The present disclosure does not limit the allocation manner of the computing resources of the slave node, and can be set as needed. as long as the divided computing resources can perform calculations on the corresponding operators.

At the same time, the device executor can further determine the tasks that the slave node needs to execute based on the logic calculation sub-graph. Then, based on the dependency relationship between the tasks, the device executor can determine at least one calculation flow, and create a calculation flow executor for each calculation flow. through each calculation flow executor and allocated computing resources, the logic calculation sub-graph is compiled to obtain a file that can be directly run by the computing device. The calculation flow executor is created by the device executor, and each calculation flow executor corresponds to a calculation flow.

The calculation flow executor returns the compilation completion information to the device executor. When the device executor receives the compilation completion information from all calculation flow executors, the device executor returns the compilation completion information to the sub graph executor. When the sub graph executor receives the compilation completion information returned by all device executors, the sub graph executor returns the compilation completion information to the session control executor. When the session control executor receives all compilation completion information returned by the sub graph executors, the session control executor returns the compilation completion information to the event executor. The master node determines the completion of the compilation of the model based on the compilation completion information received by the event executor.

It is worth mentioning that the system in the present disclosure can also flexibly add or delete operation tasks according to needs, that is, create a global parameter variable, share parameter variables within each executor, and maintain a dynamically updated mutual exclusion table at the master node. When business operations are updated, the mutual exclusion table is updated. The operation task refers to the task to be executed by each logic sub graph that is divided when the system compiles the model based on the logic calculation graph of the to-be-compiled model. In practical applications, users may make modifications to the to-be-compiled model, and commonly used compilation systems do not support dynamic modifications, resulting in low flexibility. Therefore, the present disclosure uses the names of the parameter variables mentioned above as unique identifiers. When creating an executor, the tensor partition attributes and placement information of the parameter variables of the executor are fixed. If there are tasks to be added or deleted, the system can determine the addition or deletion status of the task based on the unique identifier and mutual exclusion table, thereby dynamically updating the to-be-compiled model, improving the flexibility of the model compilation system.

The master node or the slave nodes mentioned above can be independent computing devices, independent CPUs (Central Processing Units) or GPUs (Graphics Processing Units), or divided computing units on CPUs or GPUs. Compared to a usual compilation and operation of a neural network model on an independent computing device, the distributed model compilation system or method provided by the disclosed embodiment can divide a large neural network model into multiple sub models, and allocate the multiple sub models to multiple slave nodes for compilation and operation. In this way, the distributed model compilation system provided by the disclosed embodiment can reduce the computing requirements of a single computer device, a single CPU or a single GPU, which enables collaboration and utilization of various computing resources to improve computational efficiency while ensuring an accuracy of the model. In addition, the master node can further divide the neural network model based on the status of each slave node. Then the master node can first transmit a status query request to each slave node, such that each slave node determines a current status of the slave node and return the current status to the master node. The status can include at least one of an attribute of a slave node or a real-time computing resource of a slave node. The attribute of a slave node can include: a bandwidth, a memory, a computing speed, or other attribute information of a slave node. The real-time computing resource of a node can include: a storage resource utilization, a computing resource utilization, and so on. That is, the master node can, based on the statuses of the slave nodes, determine which slave node can compile more content, to determine how to distribute multiple divided sub models, which allows for the allocation of a more complex sub model to a slave node with stronger performance and lower load. Compared to a usual compilation and operation of a neural network model on a single computing device, the distributed model compilation system or method provided by the disclosed embodiment can collaborate and fully utilize various computing resources to more efficiently compile and run a neural network model.

Figure 3:
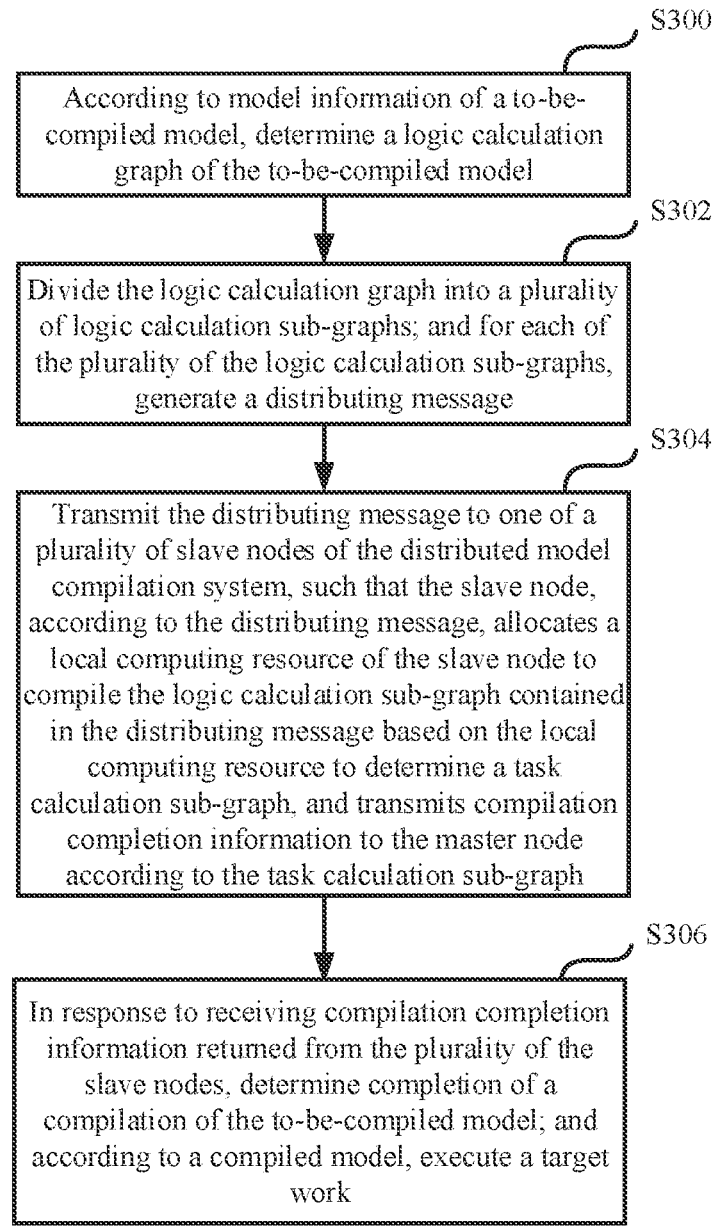
FIG. 3 is a schematic flowchart of a distributed model compilation method according to embodiments of the present disclosure.

Based on the description of the distributed model compilation system mentioned above, the present disclosure further provides a distributed model compilation method applied to the master node in the distributed system, as shown in FIG. 3.

FIG. 3 is a schematic flowchart of a distributed model compilation method according to embodiments of the present disclosure. The method includes steps S300-S306.

In S300, according to model information of a to-be-compiled model, a logic calculation graph of the to-be-compiled model is determined.

In one or more embodiments of the present disclosure, in order to improve model compilation efficiency to make the system load more balanced, and reduce resource waste, The model information of the to-be-compiled model can be determined based on the received compilation request, and then the logic calculation graph of the to-be-compiled model can be determined based on the model information. This logic calculation graph is only configured to represent the internal calculation logic of the model. Furthermore, this step can further be carried out by the event executor generated by the master node. The master node creates the corresponding event executor based on the received compilation request. The event executor can obtain information about the to-be-compiled model based on the received compilation request, and determine the logic calculation graph of the to-be-compiled model based on the obtained model information.

In S302, the logic calculation graph is divided into a plurality of logic calculation sub-graphs; and for each of the plurality of the logic calculation sub-graphs, a distributing message is generated.

The master node can transmit a query request to the slave node, and based on the status information returned by the slave node, obtain the status of the slave node. Then, according to step S300, the logic calculation graph of the to-be-compiled model can be determined. Based on the statuses of the slave nodes and the logic calculation graph, the logic calculation graph can be divided into multiple logic calculation sub-graphs. The present disclosure does not limit how to divide the logic calculation graph, which can be set according to needs. It is necessary that the divided logic calculation sub-graphs can be compiled on the slave nodes, and a slave node only needs to compile one logic calculation sub-graph.

A globally unique identifier corresponding to a logic calculation sub-graph is determined. Then, the identifier is packaged with the logic calculation sub-graph to generate a distributing message.

Furthermore, this step can further be carried out by a multi-level executor structure. According to step S300, the event executor transmits a query request to each slave node to determine the status of the slave node, and then divides the logic calculation graph based on the status of each slave node.

Then, the event executor creates a session control executor based on the logic calculation sub-graph obtained by dividing the logic calculation graph. Finally, the event executor transmits the logic calculation sub-graph and the unique identifier to the session control executor.

In S304, the distributing message is transmitted to one of the plurality of the slave nodes in the system.

In one or more embodiments of the present disclosure, when a dividing manner of the logic calculation graph is different, the corresponding relationships between the logic calculation sub-graphs and the slave nodes are also different. Since the dividing manner of the logic calculation graph by the master node in the present disclosure can be set as needed, it is necessary to determine the corresponding relationships based on the adopted dividing manner. Then, based on the corresponding relationships, the distributing message generated in step S302 is transmitted to the corresponding slave node.

Each slave node based on the logic calculation sub-graph contained in the distributing message, determines an input tensor and an output tensor of the logic calculation sub-graph, and derives a resource required for compiling the logic calculation sub-graph. based on the determined resource required for compilation, and the bandwidth utilization rate and computation resource utilization rate of the slave node, the slave node determines a local resource of the slave node allocated for the logic calculation sub-graph. The present disclosure does not limit the allocation of computing resources from slave nodes, which can be set as needed, as long as the divided computing resources can perform calculations on the corresponding operators.

Furthermore, since a logic calculation sub-graph can contain multiple interdependent computation tasks, the interdependent computational tasks can determine a calculation flow, and thus a logic calculation sub-graph can contain multiple calculation flows. Based on the allocated computing resources, the slave node compiles calculation flows separately to obtain the compilation result of the logic calculation sub-graph. Based on the compilation result, the task calculation sub-graph corresponding to the logic calculation sub-graph can be determined. After the logic calculation sub-graph is compiled by the slave node, the slave node transmits the compilation completion information containing the globally unique identifier to the master node.

Furthermore, this step can further be carried out by a multi-level executor structure. According to step S302, the session control executor creates a sub graph executor through the received logic calculation sub-graph, and determines the corresponding relationships between sub graph executors, the logic calculation sub-graphs, and the slave nodes. For each sub graph executor, the sub graph executor first creates a device executor that can be deployed on the slave node, and then generates a distributing message based on the logic calculation sub-graph, the global unique identifier and the device executor corresponding to the sub graph executor, and transmits the distributing message to the slave node corresponding to the sub graph executor.

The slave node according to the distributing message, determines the logic calculation sub-graph to be processed and a device executor. The device executor based on the logic calculation sub-graph, obtains an input tensor and an output tensor of the logic calculation sub-graph, and derives a resource required for compiling the logic calculation sub-graph. Based on the determined resource required for compilation, and the bandwidth utilization rate and computation resource utilization rate of the slave node, the slave node determines a local resource of the slave node that can be used for the compilation of the logic calculation sub-graph, and allocates the local resource for the logic calculation sub-graph.

At the same time, the device executor can further determine the tasks that the slave node needs to execute based on the logic calculation sub-graph. Then, based on the dependency relationship between the tasks, the device executor can determine at least one calculation flow, and create a calculation flow executor for each calculation flow. through each calculation flow executor and allocated computing resources, the logic calculation sub-graph is compiled to obtain a file that can be directly run by the computing device.

The calculation flow executor returns the compilation completion information to the device executor. When the device executor receives the compilation completion information from all calculation flow executors, the device executor returns the compilation completion information to the sub graph executor. When the sub graph executor receives the compilation completion information returned by all device executors, the sub graph executor returns the compilation completion information to the session control executor. When the session control executor receives all compilation completion information returned by the sub graph executors, the session control executor returns the compilation completion information to the event executor.

In S306, compilation completion information returned from the plurality of the slave nodes is received, and completion of a compilation of the to-be-compiled model is determined; and according to a compiled model, a target work is executed.

The global unique identifier is determined based on the received compilation completion information, and based on the corresponding relationships between the logic calculation sub-graphs and the global unique identifiers, it is determined which logic calculation sub-graph is compiled. When the master node determines that all the logic calculation sub-graphs of the logic calculation graph have completed compilation based on the received compilation completion information, the master node can determine that the to-be-compiled model is compiled, and according to a compiled model, execute a target work.

Since when the model is compiled, and the model can be an untrained model or a model that has already been trained and needs to be deployed, the target work can be set as needed. For example, when the compiled model is an untrained model, the target work can be to train the model based on a preset training sample set, and the model can be run in a distributed manner through the task calculation sub-graphs compiled by the slave nodes, to determine the output results of the model and adjust model parameters corresponding to the task calculation sub-graph in each slave node based on labels of samples. Alternatively, when the compiled model is a trained model, the target work can be a task executed based on the trained model. For example, the trained model is an image classification model, the master node can determine an image to be recognized based on a work request and transmit the image to a slave node corresponding to a logic calculation sub-graph of an input layer in the trained model, such that slave nodes for the middle layers sequentially transfer intermediate data according to a calculation order in the logic calculation graph, and finally the slave node corresponding to the logic calculation sub-graph of the output layer in the trained model determines an image classification result, and returns the image classification result to the master node. The master node determines an execution result of the target task based on the received classification result.

Furthermore, this step can further be carried out by a multi-level executor structure. According to step S304, the master node determines the completion of model compilation based on the compilation completion information received by the event executor, and executes the target work based on the compiled model.

Based on the distributed model compilation method shown in FIG. 3, it can be seen that during model compilation, the distributed model compilation system logically divides a calculation graph for the model to determine multiple sub graphs. Afterwards, a compilation process of each sub graph is no longer executed by the master node, but is allocated to each slave node, which reduces the load on the master node. Moreover, since sub graphs are compiled in parallel by multiple slave nodes, the model compilation efficiency can be greatly improved.

Figure 4:
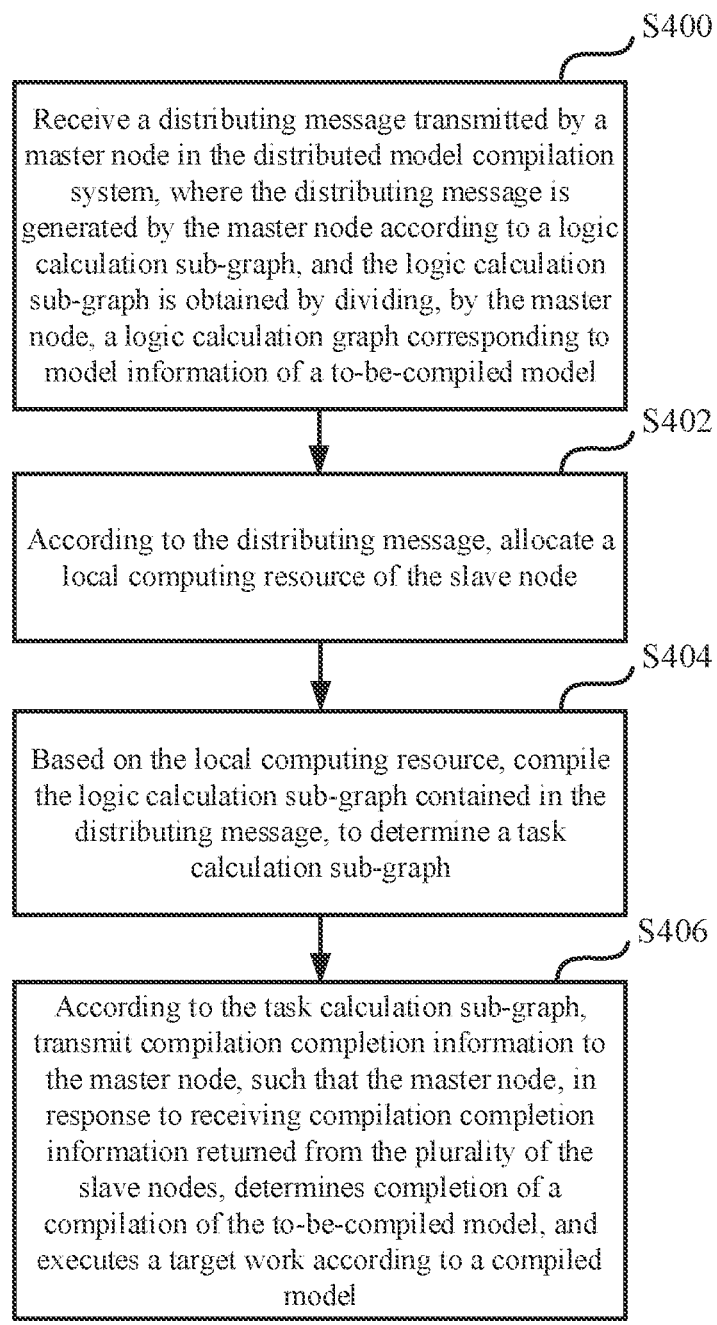
FIG. 4 is a schematic flowchart of a distributed model compilation method according to embodiments of the present disclosure.

Based on the description of the distributed model compilation system mentioned above, the present disclosure further provides a distributed model compilation method applied to each of the slave nodes in the distributed system, as shown in FIG. 4.

FIG. 4 is a schematic flowchart of a distributed model compilation method according to embodiments of the present disclosure. The method includes steps S400-S406.

In S400, a distributing message transmitted by a master node in the distributed model compilation system is received, where the distributing message is generated by the master node according to a logic calculation sub-graph, and the logic calculation sub-graph obtained by dividing a logic calculation graph corresponding to model information of a to-be-compiled model by the master node.

The distributing message transmitted by the master node is received, and based on the distributing message, the logic calculation sub-graph contained in the distributing message is determined. The master node determines the model information of the to-be-compiled model based on the received compilation request, and then determines the logic calculation graph of the to-be-compiled model based on the model information. This logic calculation graph is only configured to represent the internal calculation logic of the model. Based on the statuses of the slave nodes and the logic calculation graph, the logic calculation graph can be divided into multiple logic calculation sub-graphs. A globally unique identifier corresponding to a logic calculation sub-graph is determined. Then, the identifier is packaged with the logic calculation sub-graph to generate a distributing message, and the distributing message is transmitted to the corresponding slave node.

Furthermore, this step can further be carried out by a multi-level executor structure. The master node creates the corresponding event executor based on the received compilation request. The event executor can obtain information about the to-be-compiled model based on the received compilation request, and determine the logic calculation graph of the to-be-compiled model based on the obtained model information. The event executor transmits a query request to each slave node to determine the status of the slave node, and then divides the logic calculation graph based on the status of each slave node. The event executor creates a session control executor based on the logic calculation sub-graph obtained by dividing the logic calculation graph. Then, the event executor transmits the logic calculation sub-graph and the unique identifier to the session control executor.

The session control executor creates a sub graph executor through the received logic calculation sub-graph, and determines the corresponding relationships between sub graph executors, the logic calculation sub-graphs, and the slave nodes. For each sub graph executor, the sub graph executor first creates a device executor that can be deployed on the slave node, and then generates a distributing message based on the logic calculation sub-graph, the global unique identifier and the device executor corresponding to the sub graph executor, and transmits the distributing message to the slave node corresponding to the sub graph executor.

In S402, according to the distributing message, a local computing resource of the slave node is allocated.

Based on the logic calculation sub-graph contained in the distributing message, an input tensor and an output tensor of the logic calculation sub-graph are determined, and a resource required for compiling the logic calculation sub-graph is derived. Based on the determined resource required for compilation, as well as the bandwidth utilization rate and the computation resource utilization rate of the slave node, the device executor determines the resource available for the compilation of the logic calculation sub-graph in the local resources of the slave node, and allocates the resource. The present disclosure does not limit the allocation manner of the computing resources of the slave node, and can be set as needed, as long as the divided computing resources can perform calculations on the corresponding operators.

Furthermore, this step can further be carried out by a multi-level executor structure. Following step S400, according to the distributing message, the logic calculation sub-graph to be processed by the slave node and the device executor corresponding to the slave node are determined; and by the device executor, according to a real-time status of the slave node, an input tensor of the logic calculation sub-graph and an output tensor of the logic calculation sub-graph, the local computing resource of the slave node is allocated.

In S404, based on the local computing resource, the logic calculation sub-graph contained in the distributing message is compiled, to determine a task calculation sub-graph.

Furthermore, since a logic calculation sub-graph can contain multiple interdependent computation tasks, the interdependent computational tasks can determine a calculation flow, and thus a logic calculation sub-graph can contain multiple calculation flows. Then, based on the allocated computing resources, the slave node compiles calculation flows separately to obtain the compilation result of the logic calculation sub-graph. Based on the compilation result, the task calculation sub-graph corresponding to the logic calculation sub-graph can be determined.

Furthermore, this step can further be carried out by a multi-level executor structure. Through step S402, by the device executor, one or more tasks for compiling the logic calculation sub-graph are determined; according to the one or more tasks, at least one calculation flow is determined; and a calculation flow executor for each of the at least one calculation flow is created, the one or more tasks are executed by at least one calculation flow executor, a compilation for the logic calculation sub-graph is completed, and the task calculation sub-graph is determined.

In S406, according to the task calculation sub-graph, compilation completion information is transmitted to the master node, such that the master node, in response to receiving compilation completion information returned from the plurality of the slave nodes, determines completion of a compilation of the to-be-compiled model, and executes a target work according to a compiled model.

When the task calculation sub-graph is compiled by the slave node, it is determined that the compilation of the logic calculation sub-graph has been completed, and the compilation completion information containing the global unique identifier is returned to the master node, so that the master node can determine the global unique identifier based on the received compilation completion information, and based on the corresponding relationships between the logic calculation sub-graphs and the global unique identifiers, determine which logic calculation sub-graph is compiled. When the master node determines that all the logic calculation sub-graphs of the logic calculation graph have completed compilation based on the received compilation completion information, the master node can determine that the to-be-compiled model is compiled, and according to a compiled model, execute a target work.

Furthermore, this step can further be carried out by a multi-level executor structure. Through step S404, the calculation flow executor after completing the compilation, returns the compilation completion information to the device executor. When the device executor receives the compilation completion information from all calculation flow executors, the device executor returns the compilation completion information to the sub graph executor. When the sub graph executor receives the compilation completion information returned by all device executors, the sub graph executor returns the compilation completion information to the session control executor. When the session control executor receives all compilation completion information returned by the sub graph executors, the session control executor returns the compilation completion information to the event executor. The master node determines the completion of the compilation of the model based on the compilation completion information received by the event executor.

Based on the distributed model compilation method shown in FIG. 4, the method logically divides a calculation graph for the model to determine multiple calculation sub-graphs. Afterwards, a compilation process of each calculation sub-graph is no longer executed by the master node, but is allocated to each slave node, which improves the utilization of computing resources of the slave nodes and reduces the load on the master node. Moreover, since calculation sub-graphs are compiled in parallel by multiple slave nodes, the model compilation efficiency can be greatly improved, and the computational and storage resources of the slave nodes can be more fully utilized.

Figure 5:
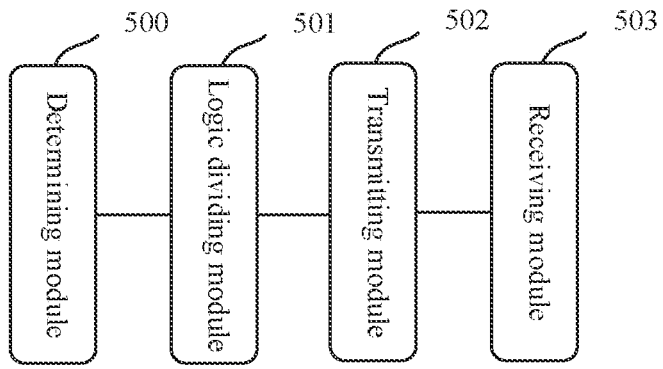
FIG. 5 is a schematic diagram of a distributed model compilation apparatus according to embodiments of the present disclosure.

During model compilation, the distributed model compilation system logically divides a calculation graph for the model to determine multiple sub graphs. Afterwards, a compilation process of each sub graph is no longer executed by the master node, but is allocated to each slave node, which improves the utilization of computing resources of the slave nodes and reduces the load on the master node. Moreover, since sub graphs are compiled in parallel by multiple slave nodes, the model compilation efficiency can be greatly improved. Moreover, the master node no longer performs a compilation for a global calculation graph, which can further reduce waiting time of the slave nodes, making full utilization of the computing resources and the storage resources of the master node and the slave nodes. The above is the distributed model compilation system and method provided by one or more embodiments of the present disclosure. Based on the same idea, the present disclosure further provides a corresponding distributed model compilation apparatus, as shown in FIG. 5. The distributed model compilation apparatus is applied to the master node in the distributed model compilation system.

FIG. 5 is a schematic diagram of a distributed model compilation apparatus according to embodiments of the present disclosure. The apparatus includes:
- a determining module 500, configured to, according to model information of a to-be-compiled model, determine a logic calculation graph of the to-be-compiled model;
- a logic dividing module 501, configured to divide the logical calculation graph into a plurality of logic calculation sub-graphs, and for each of the plurality of the logic calculation sub-graphs, generate a distributing message;
- a transmitting module 502, configured to transmit the distributing message to one of a plurality of slave nodes in the distributed model compilation system, such that the slave node, according to the distributing message, allocates a local computing resource of the slave node to compile the logic calculation sub-graph contained in the distributing message based on the local computing resource to determine a task calculation sub-graph, and transmits compilation completion information to the master node according to the task calculation sub-graph; and
- a receiving module 503, configured to receive the compilation completion information returned from the plurality of the slave nodes, determine completion of a compilation of the to-be-compiled model, and execute the target work according to a compiled model.

In some embodiments, the determining module 500 is configured to according to the compilation request, create an event executor that executes an event for the compilation request; and by the event executor, determine the model information of the to-be-compiled model according to the compilation request, and according to the model information of the to-be-compiled model, determine the logic calculation graph of the to-be-compiled model.

In some embodiments, the logic dividing module 501 is configured to determine the status of each of the slave nodes by the event executor; by the event executor, based on the status of each of the slave node, create a session control executor; by the session control executor, according to the statuses of the slave nodes, divide the logic calculation graph into the logic calculation sub-graphs, and determine a logic calculation sub-graph for each of the slave nodes; by the session control executor, for each of the logic calculation sub-graphs, create a sub graph executor for the logic calculation sub-graph; determine corresponding relationships between sub graph executors, the logic calculation sub-graphs, and the slave nodes; and for each of the sub graph executors, create a device executor deployed on a slave node corresponding to the sub graph executor, generate a distributing message according to the device executor and the logic calculation sub-graph for the sub graph executor.

In some embodiments, the transmitting module 502 is configured to, by the sub graph executor, create a device executor deployed on a slave node, generate a distributing message according to the device executor and the logic calculation sub-graph for the sub graph executor, and transmit the distributing message to the slave node corresponding to the sub graph executor; by the device executor corresponding to the slave node, determine one or more tasks for compiling the logic calculation sub-graph; according to the one or more tasks, determine at least one calculation flow; and create a calculation flow executor for each of the at least one calculation flow, execute the one or more tasks by at least one calculation flow executor, complete a compilation for the logic calculation sub-graph, and determine the task calculation sub-graph; by the device executor corresponding to the slave node, determine the task calculation sub-graph compiled by the at least one calculation flow executor, and return the task calculation sub-graph to the sub graph executor corresponding to the slave node in the master node; by the sub graph executors, receive task calculation sub-graphs returned from the slave nodes, and according to the task calculation sub-graphs, transmit the compilation completion information to the master node.

In some embodiments, the receiving module 503 is configured to by the sub graph executors, receive task calculation sub-graphs returned from the slave nodes, and according to the task calculation sub-graphs, determine the completion of the compilation of the model.

Figure 6:
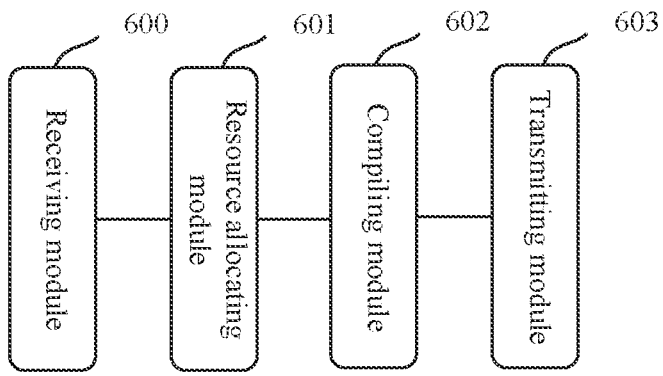
FIG. 6 is a schematic diagram of a distributed model compilation apparatus according to embodiments of the present disclosure.

The present disclosure further provides a corresponding distributed model compilation apparatus, as shown in FIG. 6. The distributed model compilation apparatus is applied to each of the slave nodes in the distributed model compilation system.

FIG. 6 is a schematic diagram of a distributed model compilation apparatus according to embodiments of the present disclosure. The apparatus includes:

- a receiving module 600, configured to receive a distributing message transmitted by a master node in the distributed model compilation system, where the distributing message is generated by the master node according to a logic calculation sub-graph, and the logic calculation sub-graph obtained by dividing a logic calculation graph corresponding to model information of a to-be-compiled model by the master node;
- a resource allocating module 601, configured to, according to the distributing message, allocate a local computing resource of the slave node;
- a compiling module 602, configured to, based on the local computing resource, compile the logic calculation sub-graph contained in the distributing message, to determine a task calculation sub-graph; and
- a transmitting module 603, configured to, according to the task calculation sub-graph, transmit compilation completion information to the master node, such that the master node, in response to receiving compilation completion information returned from the plurality of the slave nodes, determines completion of a compilation of the to-be-compiled model, and executes a target work according to a compiled model.

In some embodiments, the receiving module 600 is configured to receive distributing messages transmitted by the master node of the system; where by session control executor, for each of the plurality of the logic calculation sub-graphs, a sub graph executor for the logic calculation sub-graph is created; corresponding relationships between sub graph executors, the logic calculation sub-graphs, and the slave nodes are determined; and for each of the sub graph executors, a device executor deployed on a slave node corresponding to the sub graph executor is created, the distributing message is generated according to the device executor and the logic calculation sub-graph for the sub graph executor.

In some embodiments, the resource allocating module 601 is configured to: according to the distributing message, determine the logic calculation sub-graph to be processed by the slave node and the device executor corresponding to the slave node; and by the device executor, according to a real-time status of the slave node, an input tensor of the logic calculation sub-graph and an output tensor of the logic calculation sub-graph, allocate the local computing resource of the slave node.

In some embodiments, the compiling module 602 is configured to: by the device executor corresponding to the slave node, determine one or more tasks for compiling the logic calculation sub-graph; according to the one or more tasks, determine at least one calculation flow; and create a calculation flow executor for each of the at least one calculation flow, execute the one or more tasks by at least one calculation flow executor, complete a compilation for the logic calculation sub-graph, and determine the task calculation sub-graph.

In some embodiments, the transmitting module 603 is configured to, according to the task calculation sub-graph, transmit the compilation completion information to the master node.

The present disclosure further provides a computer-readable storage medium that stores computer programs, where the computer program may be configured to perform the distributed model compilation method provided in FIG. 3 or 4.

Figure 7:
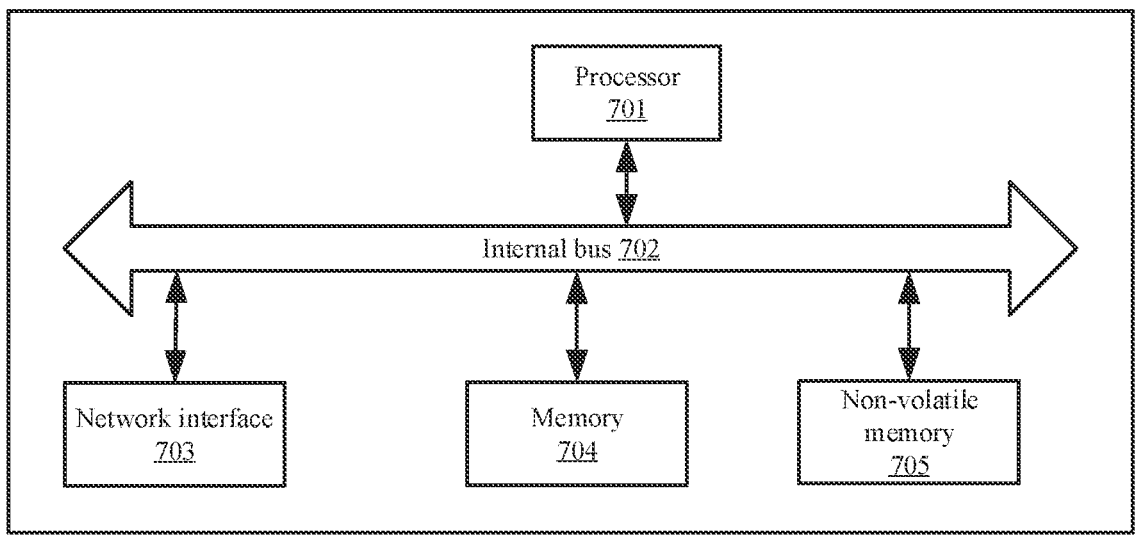
FIG. 7 is a schematic diagram of an electronic device according to embodiments of the present disclosure.

The present disclosure further provides a schematic structural diagram of the electronic device as shown in FIG. 7. As shown in FIG. 7, at the hardware level, the electronic device includes a processor 701, an internal bus 702, a network interface 703, a memory 704, and a non-volatile memory 705, and may include hardware required for other operations. The processor 701 reads the corresponding computer program from non-volatile memory 705 into memory 704 and runs it to implement the distributed model compilation method described in FIG. 3 or FIG. 4. Of course, in addition to the software implementation, the present disclosure does not exclude other implementation methods, such as logic devices or a combination of hardware and software, etc. That is, the executor of the following processing process is not limited to individual logic units, but can also be hardware or logic devices.

In the 1990s, it was clear that improvements to a technology could be distinguished between hardware improvements (e.g., improvements to circuit structures such as diodes, transistors, switches, etc.) and software improvements (improvements to a method flow). However, with the development of technology, currently, the improvements of many method flows can be regarded as the direct improvements of the hardware circuit structures. Designers almost always get the corresponding hardware circuit structure by programming the improved method flow into the hardware circuit. Therefore, it cannot be said that a method flow improvement cannot be implemented with a hardware physical module. For example, a Programmable Logic Device (PLD) (e.g., Field Programmable Gate Array (FPGA)) is one such integrated circuit whose logic function is determined by user programming of the device. A digital system is "integrated" on a PLD by the designer's own programming, without the need for a chip manufacturer to design and manufacture a dedicated integrated circuit chip. Moreover, nowadays, instead of making IC chips manually, this programming is mostly implemented by "logic compiler" software, which is similar to the software compiler used for program development and writing, and the original code has to be written in a specific programming language before it is compiled. This is called Hardware Description Language (HDL), and there is not only one HDL, but many kinds, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, the most commonly used is Very-High-Speed Integrated Circuit Hardware Description Language (VHDL) and Verilog. It should also be clear to those skilled in the art that a hardware circuit implementing the logical method flow can be easily obtained by simply programming the method flow with a little logic in one of the above hardware description languages and programming the method flow into the integrated circuit.

The controller can be implemented in any suitable manner, for example, the controller can take the form of, for example, a microprocessor or processor and a computer readable medium storing computer readable program code (e.g., software or firmware) executable by the (micro)processor, logic gates, switches, Application Specific Integrated Circuit (ASIC), programmable logic controllers and embedded microcontrollers. Examples of the controllers may include, but are not limited to, the following microcontrollers: ARC 625D, Atmel AT91SAM, Microchip PIC18F26K20, and Silicone Labs C8051F320, and memory controllers may also be implemented as part of the control logic of the memory. It is also known to those skilled in the art that, in addition to implementing the controller in a purely computer readable program code manner, it is entirely possible to make the controller perform the same function in the form of logic gates, switches, specialized integrated circuits, programmable logic controllers, embedded microcontrollers, etc. by logically programming the method steps. Thus, such a controller can be considered as a hardware component, and the devices included therein for implementing various functions can also be considered as structures within the hardware component. Or even, the apparatus for implementing various functions can be considered as both a software module for implementing a method and a structure within a hardware component.

The systems, apparatuses, modules, or units elucidated in the above embodiments can be implemented specifically by a computer chip or entity, or by a product with certain functions. An exemplary implementation device is a computer. Specifically, the computer may be, for example, a personal computer, a laptop computer, a cellular phone, a camera phone, a smart phone, a personal digital assistant, a media player, a navigation device, an email device, a gaming console, a tablet computer, a wearable device, or a combination of any of these devices.

For the convenience of description, the above devices are divided into various units according to their functions and described respectively. It is, of course, possible to implement the functions of each unit in the same or multiple software and/or hardware when implementing the present disclosure.

Those skilled in the art should understand that embodiments of the present disclosure can be provided as methods, systems, or computer program products. Therefore, the present disclosure can take the form of complete hardware embodiments, complete software embodiments, or embodiments combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure is described with reference to the flowchart and/or block diagram of the method, device (system), and computer program product according to the embodiments of the present disclosure. It is to be understood that each process and/or block in the flowchart and/or block diagram, and the combination of processes and/or blocks in the flowchart and/or block diagram, may be implemented by computer program instructions. These computer program instructions may be provided to a processor of a general-purpose computer, a specialized computer, an embedded processor, or other programmable data processing device to produce a machine such that instructions executed by the processor of the computer or other programmable data processing device produce an apparatus for implementing a function specified in one or more processes of the flowchart and/or one or more blocks of the block diagram.

These computer program instructions may also be stored in a computer-readable memory capable of directing the computer or other programmable data processing device to operate in a particular manner such that the instructions stored in the computer-readable memory produce an article of manufacture including an instruction apparatus that implements the function specified in one or more processes of the flowchart and/or one or more blocks of the block diagram.

These computer program instructions may also be loaded onto a computer or other programmable data processing device such that a series of operational steps are executed on the computer or other programmable device to produce computer-implemented processing such that the instructions executed on the computer or other programmable device provide the steps used to perform the functions specified in one or more processes of the flowchart and/or one or more blocks of the block diagram.

In an exemplary configuration, the computing device includes one or more processors (CPUs), input/output interfaces, network interfaces, and memory.

Memory may include at least one of non-permanent storage in computer readable media, random access memory (RAM) or non-volatile memory, such as read only memory (ROM) or flash RAM. Memory is an example of a computer readable medium.

Computer readable media include permanent and non-permanent, removable and non-removable media that can be implemented by any method or technology to store information. Information may be computer readable instructions, data structures, modules of a program, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read only memory (CDROM), digital versatile disc (DVD) or other optical storage, magnetic cartridge tape, magnetic tape magnetic disk storage, other magnetic storage device or any other non-transport medium that can be used to store information that can be accessed by a computing device. As defined herein, computer readable media does not include transitory computer readable media, such as modulated data signals and carriers.

It should also be noted that the term "include", "comprise" or any other variation thereof is intended to cover non-exclusive inclusion, such that a process, method, article, or device that includes a set of elements includes not only those elements, but also other elements that are not explicitly listed, or other elements that are inherent to such a process, method, commodity, or device. Without further limitation, the element defined by the statement "including a" do not preclude the existence of additional identical elements in the process, method, article, or device that include the element.

It should be understood by those skilled in the art that embodiments of the present disclosure may be provided as methods, systems or computer program products. Accordingly, the present disclosure may take the form of an entirely hardware embodiment, an entirely software embodiment, or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure may be described in the general context of computer-executable instructions executed by a computer, such as a program module. Generally, a program module includes routines, programs, objects, components, data structures, and the like that perform a specific task or implement a specific abstract data type. The present disclosure may also be practiced in distributed computing environments where tasks are performed by remote processing devices that are connected via a communication network. In distributed computing environments, program modules may be located in local and remote computer storage medium, including storage devices.

The various embodiments in the present disclosure are described in a progressive manner, and the same or similar parts between the various embodiments may be referred to each other, and each embodiment focuses on the differences from other embodiments. In particular, for a system embodiment, since it is basically similar to the method embodiment, the description is relatively simple, and for related parts, please refer to the partial description of the method embodiment.

What is claimed is:

1. A distributed model compilation system, comprising a master node and a plurality of slave nodes, wherein
   the master node is configured to:
      according to model information of a to-be-compiled model, determine a logic calculation graph of the to-be-compiled model;
      divide the logic calculation graph into a plurality of logic calculation sub-graphs;
      for each of the plurality of the logic calculation sub-graphs, generate a distributing message, and transmit the distributing message to one of the plurality of the slave nodes;
      in response to receiving compilation completion information returned from the plurality of the slave nodes, determine completion of a compilation of the to-be-compiled model; and
      according to a compiled model, execute a target work; and
   each of the plurality of the slave nodes is configured to:
      receive the distributing message transmitted by the master node;
      according to the distributing message, allocate a local computing resource of the slave node, to compile the logic calculation sub-graph contained in the distributing message based on the local computing resource to determine a task calculation sub-graph; and
      according to the task calculation sub-graph, transmit compilation completion information to the master node;
   wherein the master node is further configured to:
      according to a received compilation request, create an event executor that executes an event for the compilation request, and determine the model information of the to-be-compiled model, and for each of the plurality of the slave nodes, generate the distributing message, and transmit the distributing message to the slave node;
      by the event executor, in response to receiving the compilation completion information returned from the plurality of the slave nodes, determine the compiled model, and execute the target work according to the compiled model;
      by the event executor, determine statuses of the plurality of the slave nodes;
      according to the statuses of the plurality of the slave nodes, divide the logic calculation graph into the plurality of the logic calculation sub-graphs;
      after determining the statuses of the plurality of the slave nodes, create a session control executor by the event executor;
      by the session control executor, according to the statuses of the plurality of the slave nodes, divide the logic calculation graph into the plurality of the logic calculation sub-graphs; and
      determine a logic calculation sub-graph for each of the plurality of the slave nodes.

2. The system according to claim 1, wherein the master node is further configured to:
   by the session control executor, for each of the plurality of the logic calculation sub-graphs, create a sub graph executor for the logic calculation sub-graph;

determine corresponding relationships between sub graph executors, the logic calculation sub-graphs, and the slave nodes; and for each of the sub graph executors, create a device executor deployed on a slave node corresponding to the sub graph executor, generate a distributing message according to the device executor and the logic calculation sub-graph for the sub graph executor, and transmit the distributing message to the slave node corresponding to the sub graph executor.

3. The system according to claim 2, wherein each of the plurality of the slave nodes is further configured to:

according to the distributing message, determine the logic calculation sub-graph to be processed by the slave node and the device executor corresponding to the slave node; and by the device executor, according to a real-time status of the slave node, an input tensor of the logic calculation sub-graph and an output tensor of the logic calculation sub-graph, allocate the local computing resource of the slave node.

4. The system according to claim 3, wherein each of the plurality of the slave nodes is further configured to:

by the device executor corresponding to the slave node, determine one or more tasks for compiling the logic calculation sub-graph;

according to the one or more tasks, determine at least one calculation flow; and create a calculation flow executor for each of the at least one calculation flow, execute the one or more tasks by at least one calculation flow executor, to complete a compilation for the logic calculation sub-graph, and determine the task calculation sub-graph.

5. The system according to claim 4, wherein each of the plurality of the slave nodes is further configured to:

by the device executor corresponding to the slave node, determine the task calculation sub-graph compiled by the at least one calculation flow executor, and return the task calculation sub-graph to the sub graph executor corresponding to the slave node in the master node; and the master node is further configured to:

by the sub graph executors, receive task calculation sub-graphs returned from the plurality of the slave nodes, and according to the task calculation sub-graphs returned by the plurality of the slave nodes, determine the compiled model.

6. The system according to claim 1, wherein the master node is further configured to:

before dividing the logic calculation graph into the plurality of the logic calculation sub-graphs, transmit a query request to each slave node in the distributed model compilation system; and according to a status returned by each slave node in the distributed model compilation system, determine the plurality of the slave nodes for compiling the plurality of the logic calculation sub-graphs; and each slave node in the distributed model compilation system is configured to:

receive the query request transmitted by the master node, according to the query request, determine a real-time status of the slave node, and return the real-time status to the master node.

7. A distributed model compilation method, applied to a master node in a distributed model compilation system, comprising:

according to model information of a to-be-compiled model, determining a logic calculation graph of the to-be-compiled model;

dividing the logic calculation graph into a plurality of logic calculation sub-graphs;

for each of the plurality of the logic calculation sub-graphs, generating a distributing message, and transmitting the distributing message to one of a plurality of slave nodes of the distributed model compilation system, such that the slave node, according to the distributing message, allocates a local computing resource of the slave node to compile the logic calculation sub-graph contained in the distributing message based on the local computing resource to determine a task calculation sub-graph, and transmits compilation completion information to the master node according to the task calculation sub-graph;

in response to receiving compilation completion information returned from the plurality of the slave nodes, determining completion of a compilation of the to-be-compiled model; and according to a compiled model, executing a target work;

wherein according to the model information of the to-be-compiled model, determining the logic calculation graph of the to-be-compiled model comprises:

receiving a compilation request;

according to the compilation request, creating an event executor that executes an event for the compilation request;

by the event executor, determining the model information of the to-be-compiled model according to the compilation request, and according to the model information of the to-be-compiled model, determining the logic calculation graph of the to-be-compiled model;

dividing the logic calculation graph into the plurality of the logic calculation sub-graphs, and for each of the plurality of the logic calculation sub-graphs, generating the distributing message comprises:

by the event executor, dividing the logic calculation graph into the plurality of the logic calculation sub-graphs, and for each of the plurality of the logic calculation sub-graphs, generating the distributing message;

transmitting the distributing message to one of the plurality of the slave nodes comprises:

by the event executor, transmitting the distributing message to one of the plurality of the slave nodes; and in response to receiving the compilation completion information returned from the plurality of the slave nodes, determining the completion of the compilation of the to-be-compiled model, and executing the target work according to the compiled model comprises:

by the event executor, receiving the compilation completion information returned from the plurality of the slave nodes, determining the compiled model, and executing the target work;

wherein by the event executor, dividing the logic calculation graph into the plurality of the logic calculation sub-graphs comprises:

by the event executor, determining statuses of the plurality of the slave nodes; and according to the statuses of the plurality of the slave nodes, dividing the logic calculation graph into the plurality of the logic calculation sub-graphs;

wherein according to the statuses of the plurality of the slave nodes, dividing the logic calculation graph into the plurality of the logic calculation sub-graphs comprises:

by the event executor, creating a session control executor; and by the session control executor, according to the statuses of the plurality of the slave nodes, dividing the logic calculation graph into the plurality of the logic calculation sub-graphs, and determining a logic calculation sub-graph for each of the plurality of the slave nodes.

8. The method according to claim 7, wherein for each of the plurality of the logic calculation sub-graphs, generating the distributing message comprises:

by the session control executor, for each of the plurality of the logic calculation sub-graphs, creating a sub graph executor for the logic calculation sub-graph;

determining corresponding relationships between sub graph executors, the logic calculation sub-graphs, and the slave nodes; and for each of the sub graph executors, creating a device executor deployed on a slave node corresponding to the sub graph executor, generating a distributing message according to the device executor and the logic calculation sub-graph for the sub graph executor, and transmitting the distributing message to the slave node corresponding to the sub graph executor.

9. The method according to claim 8, wherein receiving the compilation completion information returned from the plurality of the slave nodes and determining the compiled model comprises:

by the sub graph executors, receiving task calculation sub-graphs returned from the plurality of the slave nodes, and by the session control executor, according to the task calculation sub-graphs returned by the plurality of the slave nodes, determining the compiled model.

10. The method according to claim 7, wherein before dividing the logic calculation graph into the plurality of the logic calculation sub-graphs, the method further comprises:

transmitting a query request to each slave node in the distributed model compilation system, such that each slave node in the distributed model compilation system determines a real-time status of the slave node according to the query request, and returns the real-time status to the master node; and according to the status returned by each slave node in the distributed model compilation system, determining the plurality of the slave nodes for compiling the plurality of the logic calculation sub-graphs.

11. A computer-readable storage medium, wherein the storage medium stores a computer program, and the computer program when executed by a processor achieves the method according to claim 7.

12. An unmanned device, comprising a memory, a processor and a computer program stored on the memory and runnable on the processor, wherein the processor when executing the program, achieves the method according to claim 7.

* * * * *